US008051122B2

(12) United States Patent
Uchiyama

(10) Patent No.: US 8,051,122 B2
(45) Date of Patent: Nov. 1, 2011

(54) SIMD ARITHMETIC DEVICE CAPABLE OF HIGH-SPEED COMPUTING

(75) Inventor: Masato Uchiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1042 days.

(21) Appl. No.: 11/923,085

(22) Filed: Oct. 24, 2007

(65) Prior Publication Data

US 2008/0282070 A1 Nov. 13, 2008

(30) Foreign Application Priority Data

Oct. 27, 2006 (JP) ................................ 2006-292960

(51) Int. Cl.
*G06F 7/00* (2006.01)
(52) U.S. Cl. ...................................................... 708/490
(58) Field of Classification Search .................. None
See application file for complete search history.

(56) References Cited

U.S. PATENT DOCUMENTS

| 7,272,622 | B2 * | 9/2007 | Sebot et al. | 708/200 |
| 7,500,089 | B2 * | 3/2009 | Iwanaga | 712/300 |
| 7,685,212 | B2 * | 3/2010 | Sebot et al. | 708/200 |
| 7,818,356 | B2 * | 10/2010 | Chen et al. | 708/209 |
| 2004/0054877 | A1 * | 3/2004 | Macy et al. | 712/221 |
| 2004/0054878 | A1 * | 3/2004 | Debes et al. | 712/221 |

FOREIGN PATENT DOCUMENTS

| JP | 2001-344099 | 12/2001 |
| JP | 2006-504165 | 2/2006 |
| JP | 2006-190035 | 7/2006 |

OTHER PUBLICATIONS

Office Action issued Nov. 2, 2010 in Japanese Patent Application No. 2006-292960 (with English abstract).

* cited by examiner

*Primary Examiner* — David H Malzahn
(74) *Attorney, Agent, or Firm* — Oblon, Spivak, McClelland, Maier & Neustadt, L.L.P.

(57) ABSTRACT

A general-purpose register file including a plurality of general-purpose registers stores parallel arithmetic data. A plurality of pattern registers store a plurality of items of pattern data indicating the rearrangement of data in bytes, in half words, in words, or in a combination of these units. A data select circuit selects one of the items of pattern data stored in the plurality of pattern registers according to specifying data included in an instruction. A rearranging circuit rearranges parallel arithmetic data according to the item of pattern data selected by the data select circuit.

10 Claims, 16 Drawing Sheets

| 32 | 17 16 | 15 14 | 10 9 | 5 4 | 0 |
|---|---|---|---|---|---|
| OPCODE-MAS. B | PT | SRC1 | SRC2 | DEST | |

OPCODE : Operation code
- Byte unit rearrangement ⇒ MAS. B
- Half-word unit rearrangement ⇒ MAS. H
- Word unit rearrangement ⇒ MAS. W PT : Pattern register number (2 to 5 bits)
SRC1 : Source register number 1 (5 bits)
SRC2 : Source register number 2 (5 bits)
DEST : Destination register number (5 bits)

FIG. 2A

| 32 | 18 17 | 15 14 | 10 9 | 5 4 | 0 |
|---|---|---|---|---|---|
| OPCODE-MAS. H | PT | SRC1 | SRC2 | DEST | |

OPCODE : Operation code
- Byte unit rearrangement ⇒ MAS. B
- Half-word unit rearrangement ⇒ MAS. H
- Word unit rearrangement ⇒ MAS. W PT : Pattern register number (2 to 5 bits)
SRC1 : Source register number 1 (5 bits)
SRC2 : Source register number 2 (5 bits)
DEST : Destination register number (5 bits)

FIG. 2B

| 32 | 20 19 | 15 14 | 10 9 | 5 4 | 0 |
|---|---|---|---|---|---|
| OPCODE-MAS. W | PT | SRC1 | SRC2 | DEST | |

OPCODE : Operation code
- Byte unit rearrangement ⇒ MAS. B
- Half-word unit rearrangement ⇒ MAS. H
- Word unit rearrangement ⇒ MAS. W PT : Pattern register number (2 to 5 bits)
SRC1 : Source register number 1 (5 bits)
SRC2 : Source register number 2 (5 bits)
DEST : Destination register number (5 bits)

FIG. 2C

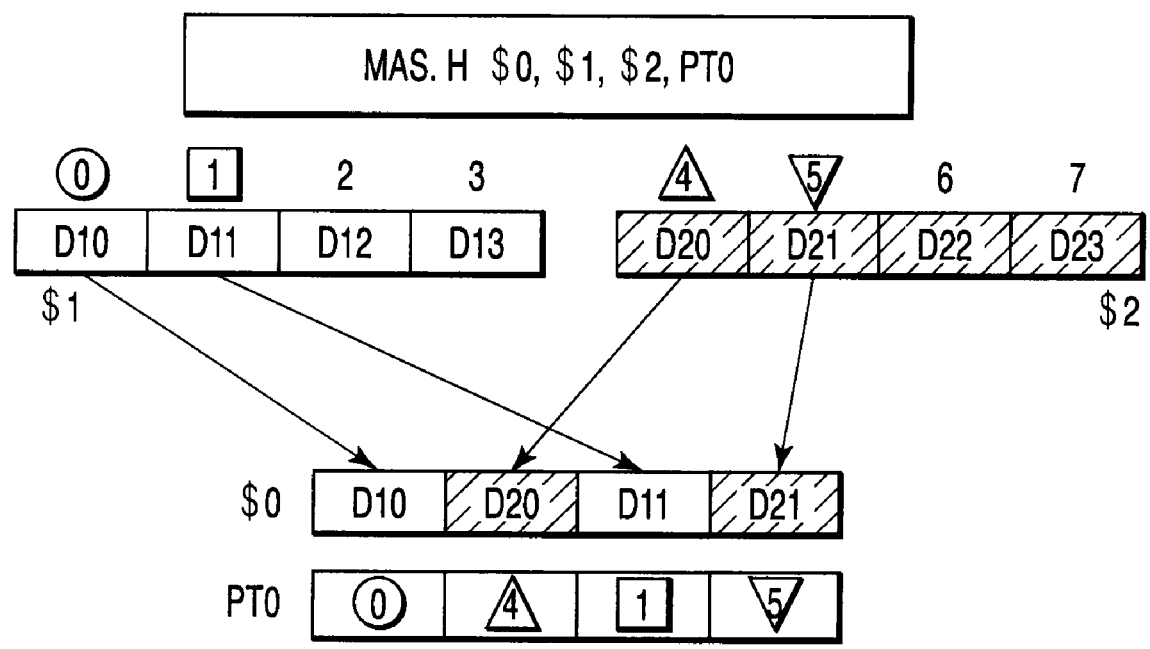
F I G. 4

| 32 | 17 16 | 15 14 | 10 9 | 5 4 | 0 |
|---|---|---|---|---|---|
| OPCODE-ADDSRT. B | PT | SRC1 | SRC2 | DEST | |

OPCODE : Operation code
- Rearrangement after byte unit addition ⇒ ADDSRT. B
- Rearrangement after half-word unit addition ⇒ ADDSRT. H
- Rearrangement after word unit addition ⇒ ADDSRT. W PT : Pattern register number (2 or 4 bits)
IPT : Word unit pattern number
SRC1 : Source register number 1 (5 bits)
SRC2 : Source register number 2 (5 bits)
DEST : Destination register number (5 bits)

FIG. 6A

| 32 | 19 18 | 15 14 | 10 9 | 5 4 | 0 |
|---|---|---|---|---|---|
| OPCODE-ADDSRT. H | PT | SRC1 | SRC2 | DEST | |

OPCODE : Operation code
- Rearrangement after byte unit addition ⇒ ADDSRT. B
- Rearrangement after half-word unit addition ⇒ ADDSRT. H
- Rearrangement after word unit addition ⇒ ADDSRT. W PT : Pattern register number (2 or 4 bits)
IPT : Word unit pattern number
SRC1 : Source register number 1 (5 bits)
SRC2 : Source register number 2 (5 bits)
DEST : Destination register number (5 bits)

FIG. 6B

| 32 | 17 16 | 15 14 | 10 9 | 5 4 | 0 |
|---|---|---|---|---|---|
| OPCODE-ADDSRT. W | IPT | SRC1 | SRC2 | DEST | |

OPCODE : Operation code
- Rearrangement after byte unit addition ⇒ ADDSRT. B
- Rearrangement after half-word unit addition ⇒ ADDSRT. H
- Rearrangement after word unit addition ⇒ ADDSRT. W PT : Pattern register number (2 or 4 bits)
IPT : Word unit pattern number
SRC1 : Source register number 1 (5 bits)
SRC2 : Source register number 2 (5 bits)
DEST : Destination register number (5 bits)

FIG. 6C

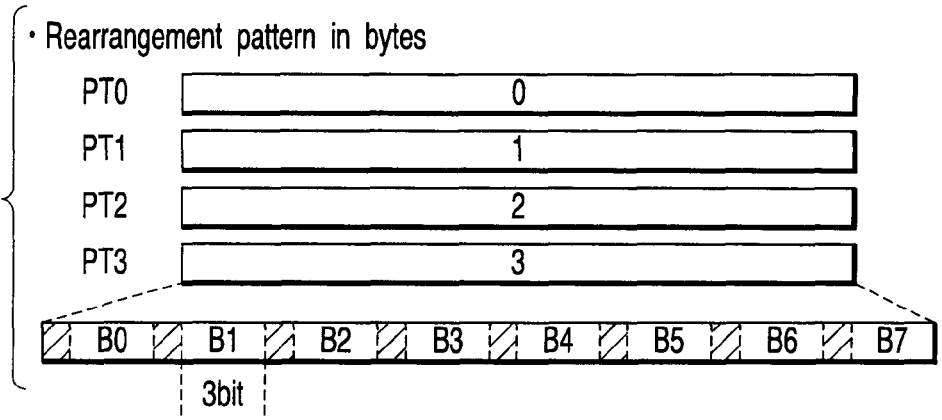
FIG. 7A
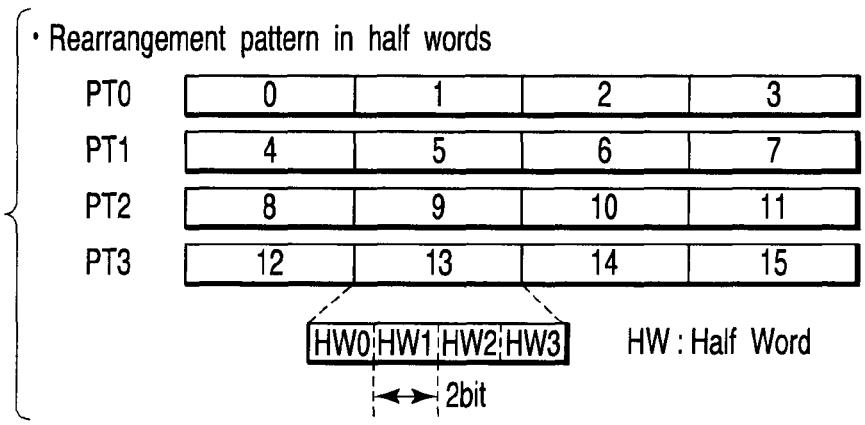
FIG. 7B
FIG. 7C
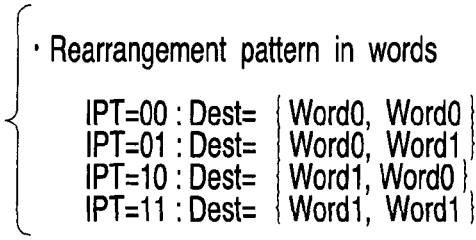
FIG. 7D
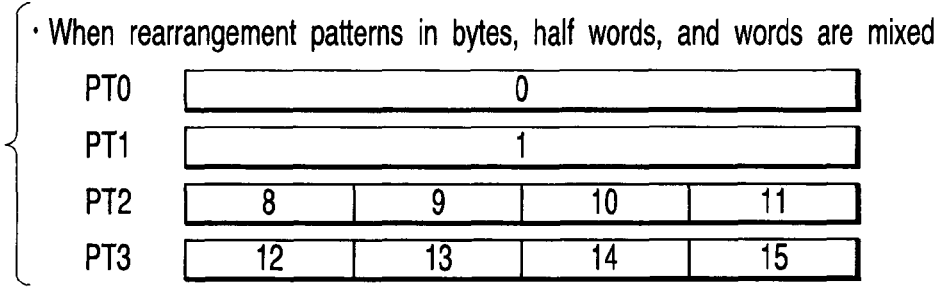

| 32 | | 1918 | 1716 | 1514 | | 109 | | 54 | | 0 |
|---|---|---|---|---|---|---|---|---|---|---|
| OPCODE-SRTADD. B | | PT1 | PT2 | SRC1 | | | SRC2 | | DEST | |

OPCODE : Operation code
- Byte unit addition after rearrangement ⇒ SRTADD. B
- Half-word unit addition after rearrangement ⇒ SRTADD. H
- Word unit addition after rearrangement ⇒ SRTADD. W PT1 : For source register 1 Pattern register number (2 or 4 bits)
PT2 : For source register 2 Pattern register number (2 or 4 bits)
IPT1 : For source register 1 Word unit pattern number
IPT2 : For source register 2 Word unit pattern number
SRC1 : Source register number 1 (5 bits)
SRC2 : Source register number 2 (5 bits)
DEST : Destination register number (5 bits)

FIG. 11A

| 32 | | 2322 | 1918 | 1514 | | 109 | | 54 | | 0 |
|---|---|---|---|---|---|---|---|---|---|---|
| OPCODE-SRTADD. H | | PT1 | PT2 | SRC1 | | | SRC2 | | DEST | |

OPCODE : Operation code
- Byte unit addition after rearrangement ⇒ SRTADD. B
- Half-word unit addition after rearrangement ⇒ SRTADD. H
- Word unit addition after rearrangement ⇒ SRTADD. W PT1 : For source register 1 Pattern register number (2 or 4 bits)
PT2 : For source register 2 Pattern register number (2 or 4 bits)
IPT1 : For source register 1 Word unit pattern number
IPT2 : For source register 2 Word unit pattern number
SRC1 : Source register number 1 (5 bits)
SRC2 : Source register number 2 (5 bits)
DEST : Destination register number (5 bits)

FIG. 11B

| 32 | | 1918 | 1716 | 1514 | | 109 | | 54 | | 0 |
|---|---|---|---|---|---|---|---|---|---|---|
| OPCODE-SRTADD. W | | IPT1 | IPT2 | SRC1 | | | SRC2 | | DEST | |

OPCODE : Operation code
- Byte unit addition after rearrangement ⇒ SRTADD. B
- Half-word unit addition after rearrangement ⇒ SRTADD. H
- Word unit addition after rearrangement ⇒ SRTADD. W PT1 : For source register 1 Pattern register number (2 or 4 bits)
PT2 : For source register 2 Pattern register number (2 or 4 bits)
IPT1 : For source register 1 Word unit pattern number
IPT2 : For source register 2 Word unit pattern number
SRC1 : Source register number 1 (5 bits)
SRC2 : Source register number 2 (5 bits)
DEST : Destination register number (5 bits)

FIG. 11C

| 32 | | 21 20 | 19 | | 15 14 | | 10 9 | | 5 4 | | 0 |
|---|---|---|---|---|---|---|---|---|---|---|---|
| OPCODE-MAS. B | | PL | PT | | SRC1 | | SRC2 | | DEST | | |

OPCODE : Operation code
- Byte unit rearrangement ⇒ MAS. B
- Half-word unit rearrangement ⇒ MAS. H
- Word unit rearrangement ⇒ MAS. W PL : Pattern acquiring position in register
- Byte unit :
  - 0 ⇒ High-order 32 bits
  - 1 ⇒ Low-order 32 bits
- Half-word unit :
  - 00 ⇒ Upper 16 bits
  - nn ⇒ an (nn - 1)-th 16 bits from highest-order bit
- Word unit :
  - 0000 ⇒ Upper 4 bits
  - nnnn ⇒ an (nnnn - 1)-th 4 bits from highest-order bit PT : Pattern register number (5 bits)
SRC1 : Source register number 1 (5 bits)
DEST : Destination register number (5 bits)
SRC2 : Source register number 2 (5 bits)

FIG. 13A

| 32 | | 22 21 | 20 19 | 15 14 | | 10 9 | | 5 4 | | 0 |
|---|---|---|---|---|---|---|---|---|---|---|
| OPCODE-MAS. H | | PL | PT | SRC1 | | SRC2 | | DEST | | |

OPCODE : Operation code
- Byte unit rearrangement ⇒ MAS. B
- Half-word unit rearrangement ⇒ MAS. H
- Word unit rearrangement ⇒ MAS. W PL : Pattern acquiring position in register
- Byte unit :
  - 0 ⇒ High-order 32 bits
  - 1 ⇒ Low-order 32 bits
- Half-word unit :
  - 00 ⇒ Upper 16 bits
  - nn ⇒ an (nn - 1)-th 16 bits from highest-order bit
- Word unit :
  - 0000 ⇒ Upper 4 bits
  - nnnn ⇒ an (nnnn - 1)-th 4 bits from highest-order bit PT : Pattern register number (5 bits)
SRC1 : Source register number 1 (5 bits)
DEST : Destination register number (5 bits)
SRC2 : Source register number 2 (5 bits)

FIG. 13B

| 32 | | 24 23 | 20 19 | 15 14 | | 10 9 | | 5 4 | | 0 |
|---|---|---|---|---|---|---|---|---|---|---|
| OPCODE-MAS. W | | PL | PT | SRC1 | | SRC2 | | DEST | | |

OPCODE : Operation code
- Byte unit rearrangement ⇒ MAS. B
- Half-word unit rearrangement ⇒ MAS. H
- Word unit rearrangement ⇒ MAS. W PL : Pattern acquiring position in register
- Byte unit :
  - 0 ⇒ High-order 32 bits
  - 1 ⇒ Low-order 32 bits
- Half-word unit :
  - 00 ⇒ Upper 16 bits
  - nn ⇒ an (nn - 1)-th 16 bits from highest-order bit
- Word unit :
  - 0000 ⇒ Upper 4 bits
  - nnnn ⇒ an (nnnn - 1)-th 4 bits from highest-order bit PT : Pattern register number (5 bits)
SRC1 : Source register number 1 (5 bits)
DEST : Destination register number (5 bits)
SRC2 : Source register number 2 (5 bits)

FIG. 13C

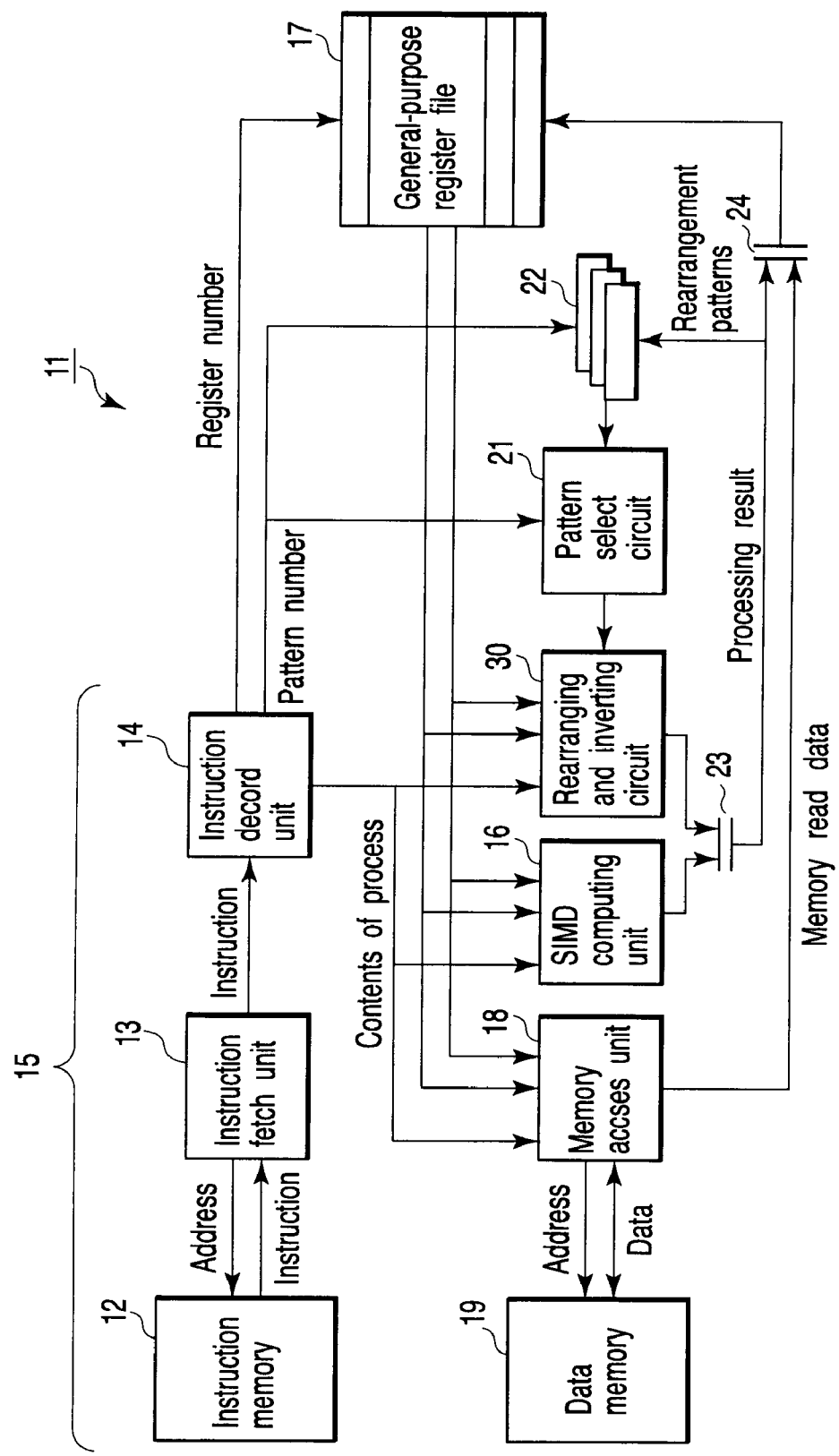
F I G. 14

```
32              17 16 1514    10 9      5 4       0
| OPCODE-MASI. B | PT | SRC1 | SRC2 | DEST |
```

OPCODE : Operation code
- Inversion after byte unit rearrangement ⇒ MASI. B
- Inversion after half-word unit rearrangement ⇒ MASI. H
- Inversion after word unit rearrangement ⇒ MASI. W PT : Pattern register number (2 or 4 bits)
SRC1 : Source register number 1 (5 bits)
SRC2 : Source register number 2 (5 bits)
DEST : Destination register number (5 bits)

FIG. 16A

```
32              1817    1514    10 9      5 4       0
| OPCODE-MASI. H | PT | SRC1 | SRC2 | DEST |
```

OPCODE : Operation code
- Inversion after byte unit rearrangement ⇒ MASI. B
- Inversion after half-word unit rearrangement ⇒ MASI. H
- Inversion after word unit rearrangement ⇒ MASI. W PT : Pattern register number (2 or 4 bits)
SRC1 : Source register number 1 (5 bits)
SRC2 : Source register number 2 (5 bits)
DEST : Destination register number (5 bits)

FIG. 16B

```
32              1918    1514    10 9      5 4       0
| OPCODE-MASI. W | PT | SRC1 | SRC2 | DEST |
```

OPCODE : Operation code
- Inversion after byte unit rearrangement ⇒ MASI. B
- Inversion after half-word unit rearrangement ⇒ MASI. H
- Inversion after word unit rearrangement ⇒ MASI. W PT : Pattern register number (2 or 4 bits)
SRC1 : Source register number 1 (5 bits)
SRC2 : Source register number 2 (5 bits)
DEST : Destination register number (5 bits)

SIMD ARITHMETIC DEVICE CAPABLE OF HIGH-SPEED COMPUTING

CROSS-REFERENCE TO RELATED APPLICATIONS

This application is based upon and claims the benefit of priority from prior Japanese Patent Applications No. 2006-292960, filed Oct. 27, 2006, the entire contents of which are incorporated herein by reference.

BACKGROUND OF THE INVENTION

1. Field of the Invention

This invention relates to an arithmetic device, and more particularly to an arithmetic device capable of single-instruction/multiple-data (SIMD) computing.

2. Description of the Related Art

When SIMD computing which enables a parallel arithmetical operation to be performed on a plurality of items of data with a single instruction is done, the items of data have to be rearranged to carry out a parallel operation on the data read from the memory. If a plurality of cycles are needed for the rearrangement of the data, the time during which the SIMD computing unit is idle increases, which prevents the original performance of the SIMD computing unit from being brought out sufficiently.

A processor capable of SIMD computing is often provided with not only arithmetic instructions but also data rearrangement instructions. Prepared instructions, however, are restricted to simple patterns because of a limitation on the number of instructions. For this reason, when a complex rearrangement inapplicable to the patterns is made, a large number of cycles are needed.

For example, in a case where the following data items have been stored in 64-bit (or 8-byte) general-purpose registers $1, $2, the data items in the two registers are merged alternately to store the resulting data in general-purpose register $0 as follows:

$1: D10, D11, D12, D13
$2: D20, D21, D22, D23
$0: D10, D20, D11, D21

In this case, as shown in program (1) below, for example, 12 instructions have to be executed:

Instruction // Description of general-purpose register    (1)

1 SRL.H $3, $1, 3 // $3 = {0, 0, 0, D10} Logically shift $1 right 3HW and store the result in $3

2 SLL.H $3, $3, 3 // $3 = {D10, 0, 0, 0} Logically shift $3 left 3HW and store the result in $3

3 SLL.H $4, $1, 1 // $4 = {D11, D12, D13, 0} Logically shift $1 left 1HW and store the result in $4

4 SRL.H $4, $4, 3 // $4 = {0, 0, 0, D11} Logically shift $4 right 3HW and store the result in $4

5 SLL.H $4, $4, 1 // $4 = {0, 0, D11, 0} Logically shift $4 left 1HW and store the result in $4

6 SRL.H $5, $2, 3 // $5 = {0, 0, 0, D21} Logically shift $2 right 3HW and store the result in $5

7 SLL.H $5, $5, 2 // $5 = {0, D20, 0, 0} Logically shift $5 left 2HW and store the result in $5

8 SLL.H $6, $2, 1 // $6 = {D21, D22, D23, 0} Logically shift $2 left 1HW and store the result in $6

9 SRL.H $6, $6, 3 // $6 = {0, 0, 0, D21} Logically shift $6 right 3HW and store the result in $6

10 OR.H $0, $3, $4 // $0 = {D10, 0, D11, 0}

Store the result of ORing $3 and $4 in $0

11 OR.H $0, $0, $5 // $0 = {D10, D20, D11, 0}

Store the result of ORing $0 and $5 in $0

12 OR.H $0, $0, $6 // $0 = {D10, D20, D11, D21}

Store the result of ORing $0 and $6 in $0

If SIMD computing is done using the result of the rearrangement, SIMD computing can be performed only once for every 13 instructions. Accordingly, the improvement of the parallelization by SIMD computing is not used sufficiently.

To overcome this problem, the introduction of a plurality of rearrangement instructions can be considered (for example, Jpn. Pat. Appln. KOKAI Publication No. 2001-344099). However, if a plurality of rearrangement instructions are provided, the area of the decode circuit for decoding instructions increases, reducing a margin for the execution timing, which makes the control more difficult.

One known technique is to execute a complex rearrangement pattern with a reconfigurable array. However, when the reconfigurable array is applied to a small-scale circuit, its occupied area in the chip is large, resulting in a low cost performance problem.

Furthermore, the following technique has been developed: rearrangement parameters are stored in a plurality of control registers; these parameters are selected by a control block and supplied to a rearrangement logical block 120; and then, the rearrangement logical block 120 rearranges the data in a vector register file 110 (for example, Japanese Unexamined Patent Application Publication No. 2006-504165).

However, when the unit of data rearrangement becomes larger, the storage area of the register which stores the rearrangement pattern data becomes smaller. In this way, when the storage area becomes smaller, an unused part develops in the register, preventing the storage area of the register from being used effectively.

For this reason, an arithmetic device capable of making effective use of the storage area for storing rearrangement pattern data has been desired.

BRIEF SUMMARY OF THE INVENTION

According to a first aspect of the invention, there is provided an arithmetic device comprising: a plurality of general-purpose registers which store parallel arithmetic data; a plurality of pattern registers which store a plurality of items of pattern data indicating the rearrangement of the data, wherein the pattern registers store a plurality of items of pattern data using at least one of the smallest bit width, a bit width twice the smallest bit width, and a bit width n times the smallest unit (where n is a power-of-two number) as a unit; a select circuit which selects one of said plurality of items of pattern data stored in said plurality of pattern registers according to specifying data included in an instruction, wherein the select circuit selects the overall pattern register when the parallel arithmetic data is rearranged using the smallest bit width as a unit, selects one of the areas obtained by dividing the pattern register in two when the parallel arithmetic data is rearranged using rearrangement bit width twice the smallest unit as a unit, and selects any one of the areas obtained by dividing the pattern register into n parts or more than n parts when the parallel arithmetic data is rearranged using a bit width n times the smallest unit (where n is a power-of-two number) as a unit; and a rearranging circuit which rearranges the parallel arithmetic data according to the item of the pattern data selected by the select circuit.

According to a second aspect of the invention, there is provided an arithmetic device comprising: a plurality of general-purpose registers which store parallel arithmetic data; a parallel computing unit which performs an arithmetical operation on parallel arithmetic data supplied from said plurality of general-purpose registers; a plurality of pattern registers which store a plurality of items of pattern data indicating the rearrangement of the data, wherein the pattern registers store a plurality of items of pattern data using at least one of the smallest bit width, a bit width twice the smallest bit width, and a bit width n times the smallest unit (where n is a power-of-two number) as a unit; a select circuit which selects one of said plurality of items of pattern data stored in said plurality of pattern registers according to specifying data included in an instruction, wherein the select circuit selects the overall pattern register when the parallel arithmetic data is rearranged using the smallest bit width as a unit, selects one of the areas obtained by dividing the pattern register in two when the parallel arithmetic data is rearranged using a bit width twice the smallest unit as a unit, and selects any one of the areas obtained by dividing the pattern register into n parts or more than n parts when the parallel arithmetic data is rearranged using a bit width n times the smallest unit (where n is a power-of-two number) as a unit; and a rearranging circuit which rearranges the data output from the parallel computing unit according to the item of the pattern data selected by the select circuit.

According to a third aspect of the invention, there is provided an arithmetic device comprising: a plurality of general-purpose registers which store parallel arithmetic data; a plurality of pattern registers which store a plurality of items of pattern data indicating the rearrangement of the data, wherein the pattern registers store a plurality of items of pattern data using at least one of the smallest bit width, a bit width twice the smallest bit width, and a bit width n times the smallest unit (where n is a power-of-two number) as a unit; a select circuit which selects one of said plurality of items of pattern data stored in said plurality of pattern registers according to specifying data included in an instruction, wherein the select circuit selects the overall pattern register when the parallel arithmetic data is rearranged using the smallest bit width as a unit, selects one of the areas obtained by dividing the pattern register in two when the parallel arithmetic data is rearranged using a bit width twice the smallest unit as a unit, and selects any one of the areas obtained by dividing the pattern register into n parts or more than n parts when the parallel arithmetic data is rearranged using a bit width n times the smallest unit (where n is a power-of-two number) as a unit; a plurality of rearranging circuits which rearrange data supplied from said plurality of general-purpose registers according to the item of the pattern data selected by the select circuit; and a parallel computing unit which performs an arithmetical operation on the data supplied from said plurality of rearranging circuits.

BRIEF DESCRIPTION OF THE SEVERAL VIEWS OF THE DRAWING

FIGS. 2A to 2C each show the format of a data rearrangement instruction executed by the processor of FIG. 1;

FIG. 4 shows an example of a rearrangement instruction and an example of a rearrangement process corresponding to the instruction;

FIGS. 6A to 6C each show an example of the format of an SIMD instruction including a data rearrangement instruction executed by the processor of FIG. 5;

FIGS. 7A to 7D show the configurations of the pattern registers and rearrangement patterns in words;

FIGS. 11A to 11C each show an example of an information format in the third embodiment;

FIGS. 13A to 13C each show an example of an information format in the fourth embodiment;

FIG. 14 shows the configuration of a processor according to a fifth embodiment of the invention;

FIGS. 16A to 16C each show an example of an information format in the fifth embodiment.

DETAILED DESCRIPTION OF THE INVENTION

Hereinafter, referring to the accompanying drawings, embodiments of the invention will be explained.

First Embodiment

Figure 1:
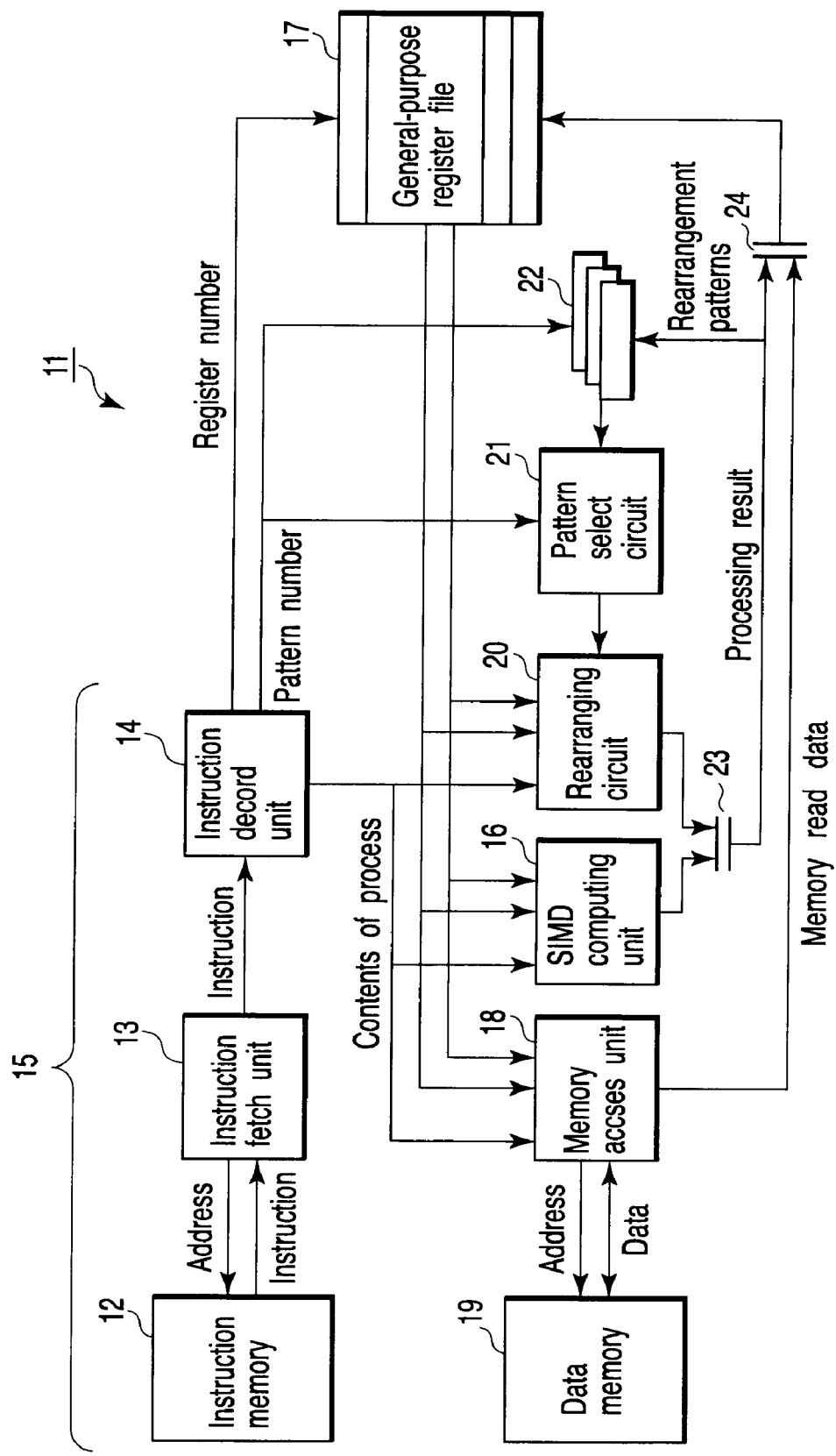
FIG. 1 shows the configuration of a processor according to a first embodiment of the invention.

FIG. 1 shows a processor 11 according to a first embodiment of the invention. The processor 11 comprises, for example, a base processor pipe line 15 which includes an instruction memory 12, an instruction fetch unit 13, and an instruction decode unit 14, an SIMD computing unit 16, a general-purpose register file 17 which includes a plurality of general-purpose registers, a memory access unit 18, a data memory 19, a rearranging circuit 20, a pattern select circuit 21, a plurality of pattern registers 22, and selectors 23, 24.

The instruction memory 12 stores a plurality of instructions. Each of the instructions includes an operation code indicating the contents of a process, a source register number for specifying a general-purpose register, a destination register number, and a pattern register number as described later. The instruction fetch unit 13 is connected to the instruction memory 12 and takes an instruction to be executed out of the instruction memory 12 according to an address output from a program counter (not shown). The instruction decode unit 14 is connected to the instruction fetch unit 13, SIMD computing unit 16, general-purpose register file 17, memory access unit 18, rearranging circuit 20, pattern select circuit 21, and the plurality of pattern registers 22. The instruction decode unit 14 decodes an instruction supplied from the instruction fetch unit 13 and outputs data indicating the contents of a process, the register number, and the rearrangement pattern number as the decoding result. The data showing the contents of a process output from the instruction decode unit 14 is supplied to the SIMD computing unit 16, memory access unit 18, and rearranging circuit 20. The register number is supplied to the general-purpose register file 17. The pattern number (register number) is supplied to the pattern select circuit 21 and pattern register 22.

The general-purpose register file 17 is composed of, for example, 32 general-purpose registers each having a length of, for example, 64 bits (8 bytes/4 half words/2 words) and stores parallel arithmetic data, rearrangement pattern data, or the like. The general-purpose register file 17 is connected to the SIMD computing unit 16, memory access unit 18, and rearranging circuit 20. When receiving a register number from the instruction decode unit 14, the general-purpose register file 17 supplies the data stored in the register corresponding to the register number to the SIMD computing unit 16, memory access unit 18, and rearranging circuit 20.

The memory access unit 18 is connected to the data memory 19 and reads data from or writes data into the data memory 19 according to the data indicating the contents of the process. The data memory 19 stores data necessary for computing, pattern data indicating data rearrangement patterns described later, and the like.

The pattern register 22 is composed of, for example, four registers each having a length of 32 bits. The pattern register 22 holds a plurality of items of pattern data. The pattern register 22 is connected to the pattern select circuit 21. According to the pattern number supplied from the instruction decode unit 14, the pattern select circuit 21 selects the rearrangement pattern data held in the pattern register 22 and supplies it to the rearranging circuit 20.

According to the supplied pattern data, the rearranging circuit 20 rearranges the data supplied from the general-purpose register file 17. The rearranging circuit 20 is connected to one input end of the selector 23. The other input end of the selector 23 is connected to the output end of the SIMD computing unit 16. The output end of the selector 23 is connected to one input end of the selector 24. The other input end of the selector 24 is connected to the output end of the memory access unit 18. The output end of the selector 24 is connected to the general-purpose register file 17. The operation results of the SIMD computing unit 16, memory access unit 18, and rearranging circuit 20 are supplied to the general-purpose register file 17 via the selectors 23, 24.

FIGS. 2A to 2C each show the format of a data rearrangement instruction executed by the processor of FIG. 1. Each of the instructions is composed of, for example, five bit fields: an operation code (OPCODE), two source register numbers (SRC1, SRC2), a destination register number (DEST), and a pattern register number (PT).

In each instruction, MAS. x (x=B, H, or W) is an operation code representing a rearrangement (MAS: merge and sort) instruction, where B means rearrangement in bytes, H means rearrangement in half words, and W means rearrangement in words. SRC1 and SRC2 are two source register numbers, specifically general-purpose register numbers. DEST is a destination register number, specifically a general-purpose register number. PT is a number specifying rearrangement pattern data. Specifically, in the case of a byte unit, the smallest unit of rearrangement, PT is the number of a pattern register.

In the case of a half byte unit which has twice the bit width of the smallest unit, PT is the number of one of the two areas into which a pattern register is divided. Moreover, in the case of a word unit which has n times the bit width of the smallest unit (n is a power-of-two number), PT is the number of any one of the areas obtained by dividing a pattern register into n parts or more than n parts.

In the case of rearrangement in bytes shown in FIG. 2A, PT is composed of 2 bits; in the case of rearrangement in half words shown in FIG. 2B, PT is composed of 3 bits; and in the case of rearrangement in words shown in FIG. 2C, PT is composed of 5 bits.

FIGS. 3A to 3D show the configurations of the pattern registers 22 and the formats of pattern data to be registered in the pattern registers. In the pattern register 22, rearrangement patterns as shown in FIGS. 3A to 3D are registered in advance. Pattern data registered in the pattern register 22 have been stored in the data memory 19 as described above. The pattern data registered in the data memory 19 is stored in the pattern register 22 via the general-purpose register file 17.

Figure 3A:
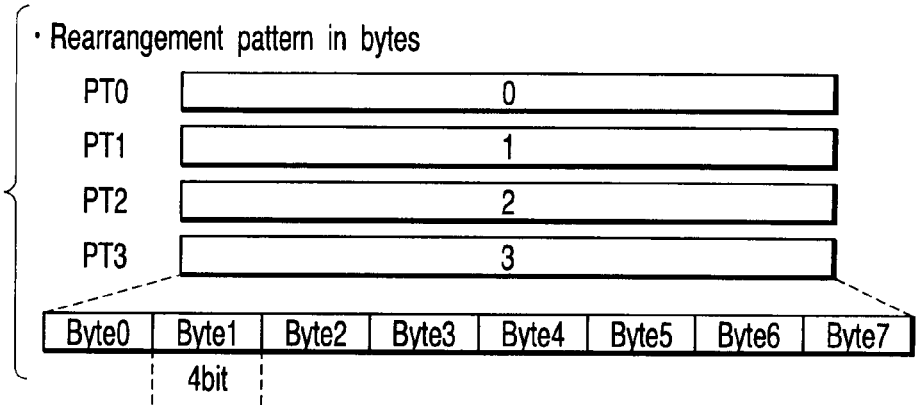
FIGS. 3A to 3D show the configurations of the pattern registers and the formats of pattern data registered in the pattern registers.

FIG. 3A shows the case of rearrangement in bytes (MAS. B). In this case, the data in two source registers have to be rearranged and then copied into each of 8 bytes in a destination register. That is, to select 8-byte data from 16-byte data, 4 bits are needed. Accordingly, a total of 8×4=32 bits, equal to the number of bits in a pattern register, are needed. Each 1-byte (4-bit) data is caused to correspond to the data in the corresponding source register. Thus, in the case of rearrangement in bytes, up to 4 types of pattern data can be registered in 32 bits×4 pattern registers. The four types of pattern data are selected by a 2-bit pattern register number PT shown in FIG. 2A.

Figure 3B:
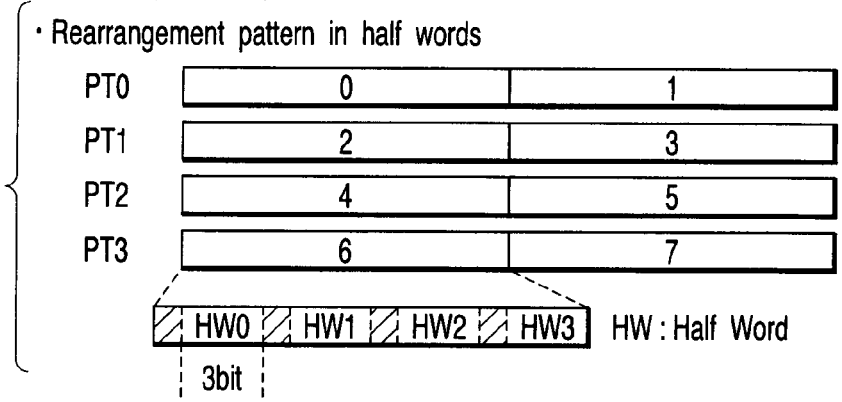

FIG. 3B shows the case of rearrangement in half words (MAS. H). In this case, the data in two source registers have to be rearranged and then copied into each of 4 half words in a destination register. That is, to select 4 half-word data from 8 half-word data, 3 bits are needed. Accordingly, a total of 4×3=12 bits are needed. Each of HW0 to HW3 in FIG. 3B contains 3 bits. Unused 1 bit is added to each of HW0 to HW3. It follows that they amount to 16 bits, which corresponds to half the area of a pattern register. Accordingly, in the case of rearrangement in half words as shown in FIG. 3B, up to 8 types of pattern data can be registered, taking data delimiters into account. The eight types of pattern data are selected by a 3-bit pattern register number PT shown in FIG. 2B.

Figure 3C:
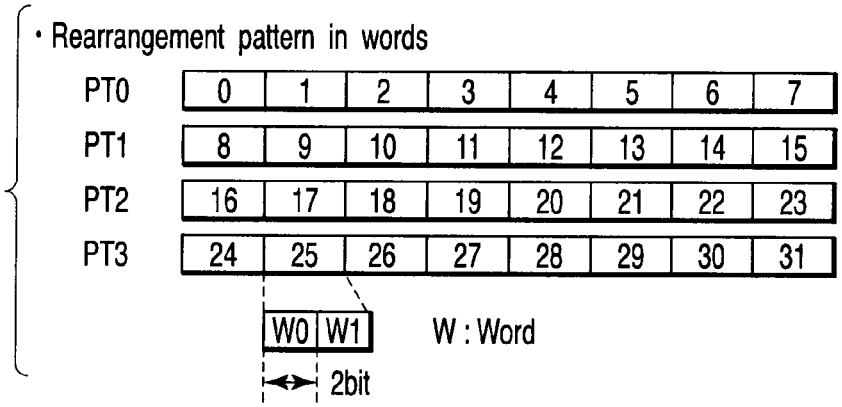

FIG. 3C shows the case of rearrangement in words (MAS. W). In this case, the data in two source registers have to be copied into each of 2 words in a destination register. That is, to select 2-word data from 4-word data, 2 bits are needed. Accordingly, a total of 2×2=4 bits are needed. Thus, this corresponds to one-eighth the area of a single pattern register. Accordingly, in the case of rearrangement in words as shown in FIG. 3C, up to 32 types of pattern data can be registered, taking data delimiters into account. The 32 types of pattern data are selected by a 5-bit pattern register number PT shown in FIG. 2C.

Figure 3D:
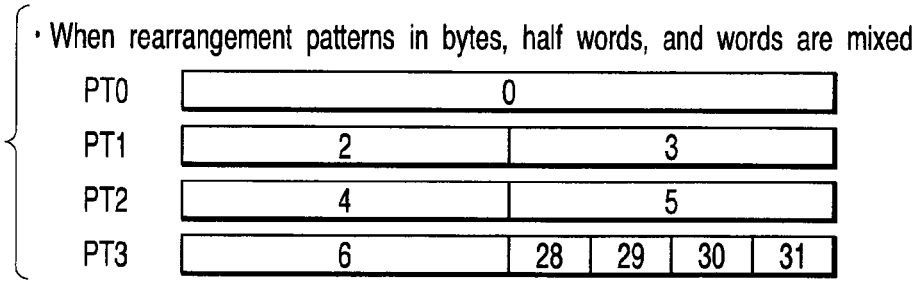

FIG. 3D shows a case where rearrangement patterns in bytes, in half words, and in words are mixed. Such a configuration may be used.

Pattern data is registered in the pattern register 22 as follows. For example, the data memory 19 stores a plurality of items of pattern data necessary for data rearrangement. The pattern data is composed of bytes, half words, or words. The pattern data stored in the data memory 19 is read according to, for example, the following instruction 1 and instruction 2 and transferred to the general-purpose register file 17 and then stored in the pattern register 22.

Instruction 1: lw $1, ($2)
Instruction 2: mv PT0, $1

Specifically, first, the instruction fetch unit 13 specifies an address and reads instruction 1 (load word instruction) in the instruction memory 12. The read instruction 1 is decoded by the instruction decode unit 14. The decoding result is supplied to the memory access unit 18, general-purpose register file 17, and pattern register 22. According to the decoding result, the general-purpose register file 17 reads the data in the general-purpose register $2 and sends it to the memory access unit 18. Using the data in the general-purpose register $2 as an address, the memory access unit 18 reads the pattern data from the data memory 19. The read pattern data is stored in the specified general-purpose register $1 in the general-purpose register file 17 via the selector 24.

Next, the instruction fetch unit 13 specifies an address and reads instruction 2 (move instruction) from the instruction memory 12. The instruction decode unit 14 decodes the read instruction 2. According to the decoding result, the general-purpose register file 17 reads the data from the general-purpose register $1 and sends it to the SIMD computing unit 16. The SIMD computing unit 16 does nothing. The data passed through the SIMD computing unit 16 is written into the pattern register PT0 specified via the selector 23.

As a result of repeating instruction 1 and instruction 2, pattern data is stored into the pattern registers PT0 to PT3.

The method of storing pattern data into the pattern register 22 is not limited to the above example and may be modified suitably.

FIG. 4 shows an example of a rearrangement instruction and an example of the rearranging process corresponding to the instruction. In FIG. 4, rearrangement instruction MAS. H $0, $1, $2, PT0 is an instruction to rearrange the data in the general-purpose registers $1 and $2 and store the resulting data into the general-purpose register $0 according to the pattern data held in pattern register 0 (PT0) among four pattern registers.

When the rearrangement instruction MAS. H is issued, the data rearranging circuit 20 reads the data from the two general-purpose registers $1, $2 of the general-purpose register file 17. Moreover, the data rearranging circuit 20 reads pattern data representing a rearrangement pattern from the pattern register PT0 specified by number PT0 of the pattern register in the instruction. Thereafter, according to the pattern data, the data rearranging circuit 20 rearranges the data read from the general-purpose registers $1, $2. The rearranged data is transferred via the selectors 23, 24 to the general-purpose register file 17, which stores the data. Thereafter, when an SIMD computing instruction is issued, the rearranged data is read from the general-purpose register file 17. The SIMD computing unit 16 then performs an arithmetical operation on the rearranged data. The result of the arithmetical operation is stored into the selected general-purpose register via the selectors 23, 24. In this way, data rearrangement and SIMD computing are performed.

With the first embodiment, pattern data representing a rearrangement pattern is registered in the pattern register 22 in advance, the pattern select circuit 21 selects a rearrangement pattern according to the pattern register number PT included in a rearrangement instruction, and the rearranging circuit 20 rearranges the contents of the general-purpose register according to the selected rearrangement pattern. Therefore, according to the first embodiment, the rearranging process carried out by 12 instructions shown in the aforementioned program (1) can be completed by a single instruction shown in FIG. 4. Consequently, the time required to rearrange the data can be shortened remarkably and therefore the computing speed of the SIMD computing unit 16 can be improved.

Moreover, a plurality of items of pattern data are stored in a plurality of pattern registers 22, which makes it possible to rearrange data into a required pattern, while suppressing the increase of rearrangement instructions.

Furthermore, when rearrangement is performed in a plurality of units, in bytes, in half words, and in words, the number of items of pattern data stored in the pattern register 22 is changed according to the unit. This enables the storage area of the pattern register 22 to be used effectively.

When an unused area develops in the pattern register as shown in FIG. 3B, for example, an optional function may be set in the unused area.

Second Embodiment

Figure 5:
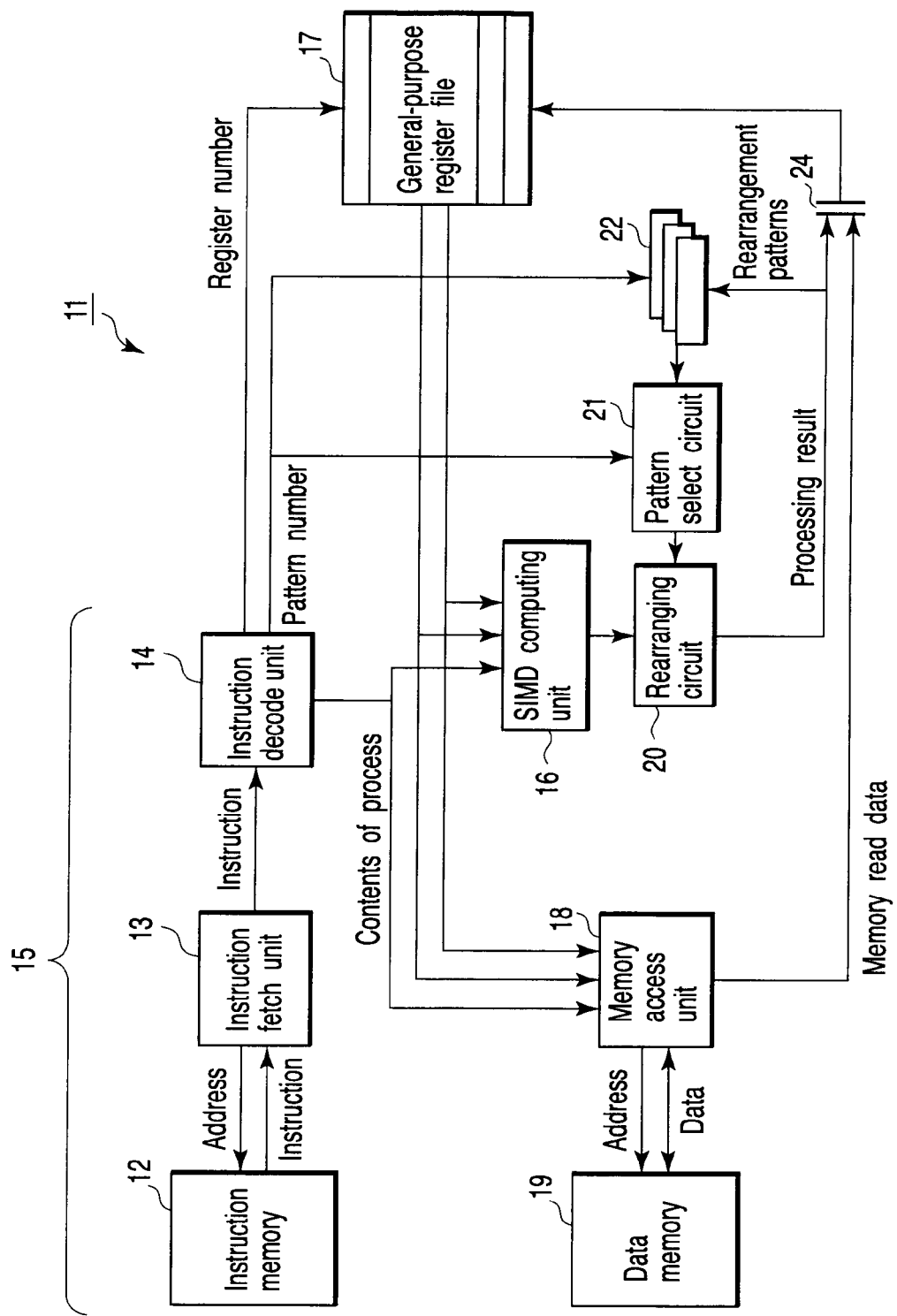
FIG. 5 shows the configuration of a processor according to a second embodiment of the invention.

FIG. 5 shows a processor according to a second embodiment of the invention. In the embodiments below, the same parts as those in FIG. 1 are indicated by the same reference numbers. Only what differs from FIG. 1 will be explained.

In the first embodiment, the SIMD computing unit 16 and rearranging circuit 20 are arranged in parallel. The rearranging circuit 20 rearranges data independently from the SIMD computing unit 16.

In contrast, as shown in FIG. 5, the processor of the second embodiment has the SIMD computing unit 16 and rearranging circuit 20 arranged in series. The SIMD computing unit 16 and rearranging circuit 20 are operated by a single SIMD computing instruction including a rearrangement instruction. Specifically, according to an instruction, the SIMD computing unit 16 performs SIMD computing on the data in the general-purpose register. The rearranging circuit 20 rearranges the output data of the SIMD computing unit 16. The output data of the rearranging circuit 20 is stored in the specified general-purpose register in the general-purpose register file 17 as a result of the SIMD computing instruction.

FIGS. 6A to 6C each show an example of the format of an SIMD instruction including a data rearrangement instruction executed by the processor of FIG. 5.

Each of the instructions is composed of five bit fields: an operation code (OPCODE), a pattern register number (PT) or a pattern number (IPT), and two source register numbers (SRC1, SRC2), and a destination register number (DEST).

Specifically, in FIGS. 6A to 6C, operation code ADD SRT. x (x=B, H, or W) representing the contents of an operation indicates an instruction to perform the addition of SIMD and rearrange the result and store the result of the arithmetical operation in the destination register. B indicates byte units, H half indicates word units, and W indicates word units. The pattern register number PT shown in FIGS. 6A and 6B indicates a pattern register number used in rearranging the results of computing in bytes and in half words. The pattern number IPT shown in FIG. 6C is a number specifying one of the four types of patterns explained later to rearrange the results of computing in words. SRC1 and SRC2 represent two source register numbers necessary for processing, that is, the numbers of general-purpose registers. DEST indicates a destination register number in which the result of computing is stored, that is, the number of a general-purpose register.

The number of source registers is not limited to 2 and may be more than 2, provided that they fit in the bit width of the instruction.

FIGS. 7A to 7D show the configurations of the pattern registers 22 and examples of rearrangement patterns.

FIG. 7A shows an example of rearrangement in bytes (ADDSRT. B). In this case, the result of computing at the SIMD computing unit 16 is stored in a register (not shown). Therefore, 8 bytes of data in a single register in the SIMD computing unit 16 have to be copied into each of 8 bytes in the destination register. That is, to select 8-byte data, 3 bits are needed. Accordingly, a total of 8×3=24 bits are needed. In this case, up to 4 types of pattern data can be registered. The four types of pattern data are selected by a 2-bit pattern register number PT shown in FIG. 6A.

FIG. 7B shows an example of rearrangement in half words (ADDSRT. H). In this case, 4 items of half-word data in a register in the SIMD computing unit 16 have to be copied into 4 half words in the destination register. That is, to select 4 half words of data, 2 bits are needed. Accordingly, a total of 4×2=8 bits are needed. In this case, as shown in FIG. 7B, up to 16 types of pattern data can be registered. The 16 types of pattern data are selected by a 4-bit pattern register number PT shown in FIG. 6B.

FIG. 7C shows an example of rearrangement in words (ADDSRT. H). In this case, there are only four types of pattern data as shown in FIG. 7C. Specifically, there are only four patterns of rearranging the results of computing {Word 0, Word 1} at the SIMD computing unit 16. For this reason, instead of preparing a field for a 6-bit pattern register number PT to select pattern data, as shown in FIG. 6C, a special 2-bit field IPT for directly specifying a pattern is prepared.

FIG. 7D shows a case where rearrangement patterns in bytes, in half words, and in words are mixed. Such a configuration may be used.

Figure 8:
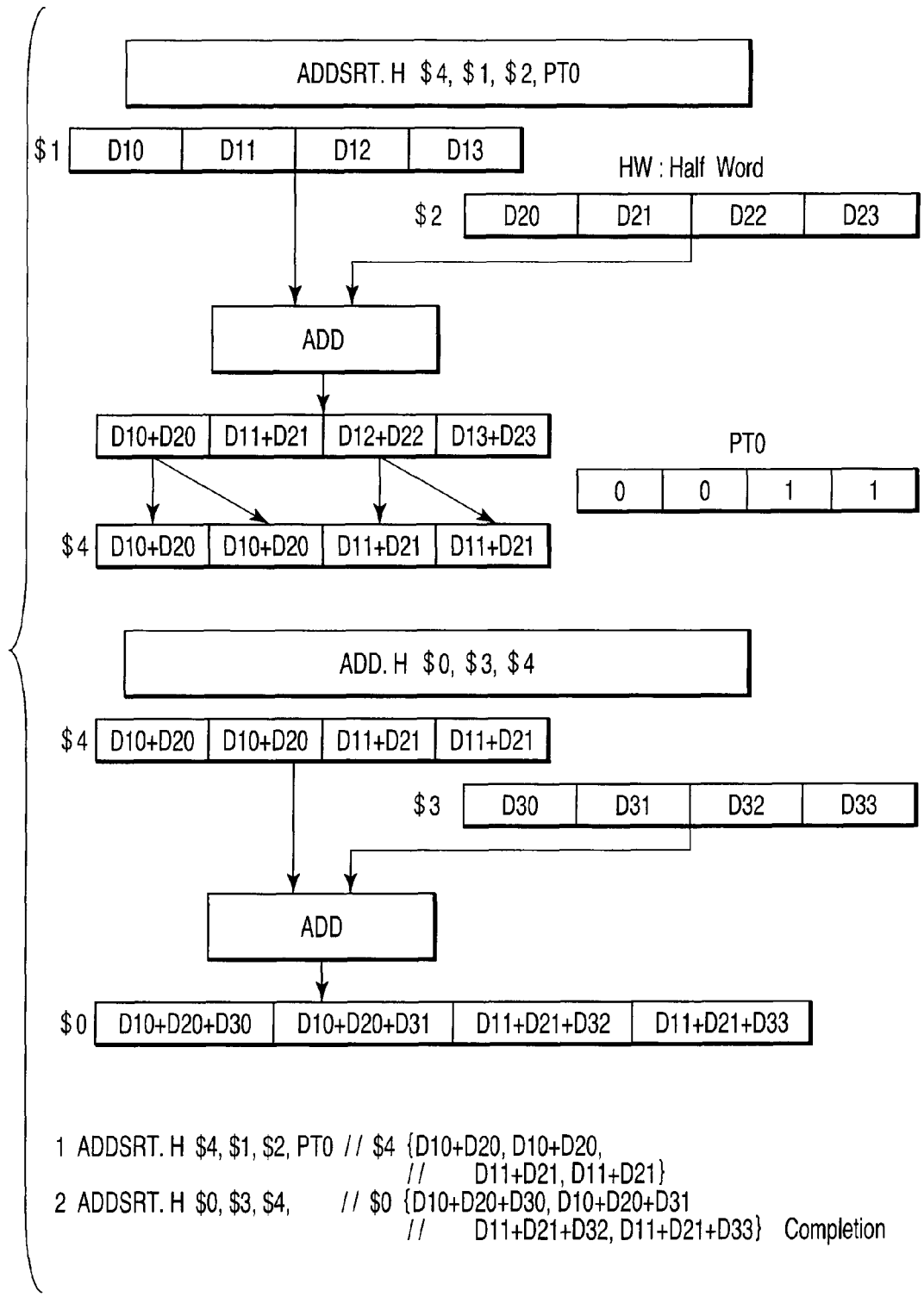
FIG. 8 is a diagram to help explain the operation of the second embodiment.

With the above configuration, the operation when, for example, an ADDSRT. H instruction and an ADD. H instruction are issued sequentially as shown in FIG. 8 will be explained. First, when an ADDSRT. H instruction is issued, the SIMD computing unit 16 reads the data in the specified general-purpose registers $1, $2 from the general-purpose register file 17 and adds them. The rearranging circuit 20 rearranges the results of computing and stores the result into the destination register $4. Specifically, the rearranging circuit 20 reads the data in the pattern register corresponding to the pattern register number PT0 specified in the instruction and rearranges the results of computing.

Thereafter, when an ADD. H instruction is issued, the SIMD computing unit 16 reads the data in the specified general-purpose registers $3, $4 from the general-purpose register file 17 and adds them. At this time, the rearranging circuit 20 does no processing and causes the data to pass through. The result of computing is stored into the destination register $0.

In the second embodiment, a plurality of items of pattern data are stored into a plurality of pattern registers 22 in advance. Alternatively, a pattern number IPT is set in the instruction. This makes it possible to perform necessary rearrangement, while reducing the number of instructions needed to rearrange data.

Figure 9:
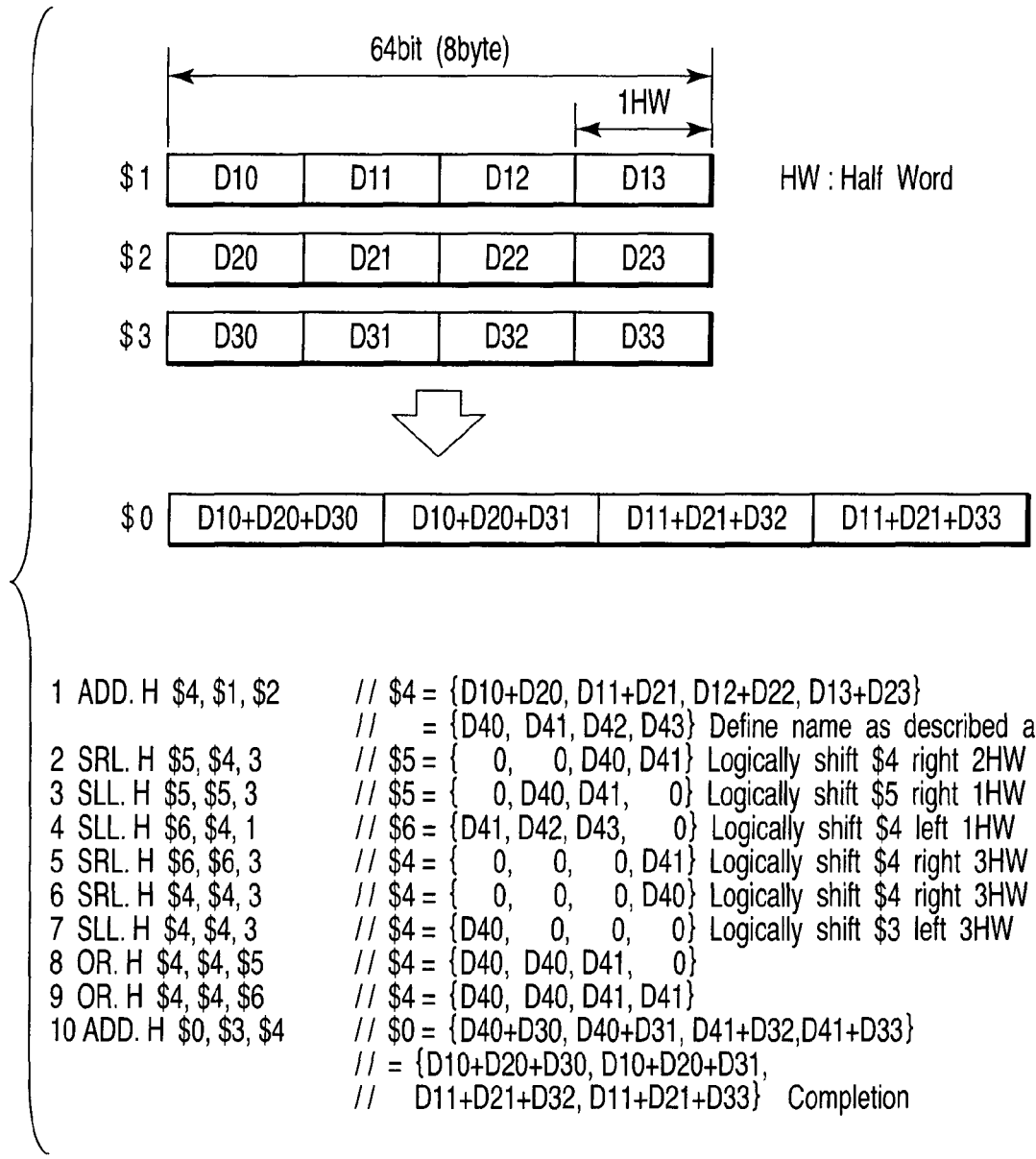
FIG. 9 shows an example of conventional instructions.

Furthermore, the SIMD computing unit 16 and rearranging circuit 20 are arranged in series. After the computing at the SIMD computing unit 16, rearranging is done at the rearranging circuit 20 on the basis of the pattern data in the pattern register 22 or the pattern number IPT in the instruction. This enables SIMD computing and data rearrangement to be performed with a single instruction. Accordingly, as shown in FIG. 9, a process which needed conventional 10 instructions can be completed with two instructions, which improves the computing speed.

Third Embodiment

Figure 10:
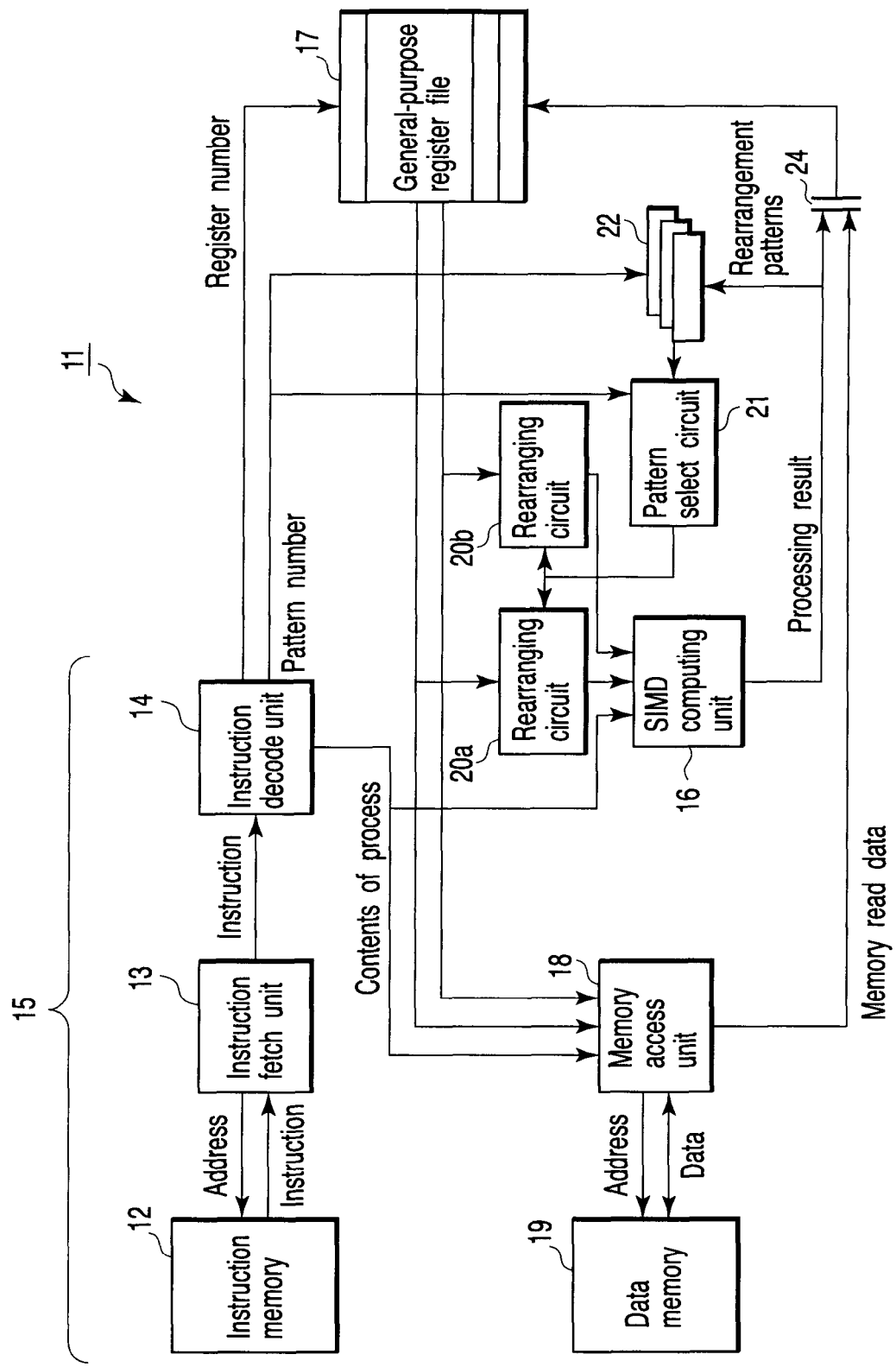
FIG. 10 shows the configuration of a processor according to a third embodiment of the invention.

FIG. 10 shows a processor according to a third embodiment of the invention. In the second embodiment, after SIMD computing, data is rearranged. In contrast, the third embodiment is so configured that the data in two source registers are rearranged before SIMD computing.

Specifically, the input ends of two rearranging circuits 20a, 20b are connected to the general-purpose register file 17. the output ends of the rearranging circuits 20a, 20b are connected to the SIMD computing unit 16. The output end of the pattern select circuit 21 is connected to the rearranging circuits 20a, 20b.

FIGS. 11A to 11C each show an example of an instruction format in the third embodiment. Each of the instructions shown in FIGS. 11A to 11C is composed of six bit fields: an operation code (OPCODE), pattern register numbers (PT1, PT2) or word unit pattern numbers (IPT1, IPT2), and source register numbers (SRC1, SRC2), and a destination register number DEST.

Operation code SRTADD. x (x=B, H, or W) means that the addition of SIMD is done after rearrangement. The 2- or 4-bit pattern register numbers PT1, PT2 specify the pattern registers corresponding to the source registers SRC1, SRC2, respectively. The word-unit pattern numbers IPT1, IPT2 specify the pattern registers corresponding to the source registers SRC1, SRC2, respectively. SRC1 and SRC2 indicate two source register numbers necessary for processing, that is, general-purpose register numbers. DEST indicates the number of a destination register in which the result of computing is stored, that is, a general-purpose register number.

Next, an example of a concrete instruction is shown:

SRTADD. H $0, $1, $2, PT1, PT2

When the above instruction is executed, the rearranging circuits 20a, 20b rearrange the data read from the source registers $1, $2 according to the pattern data stored in the pattern registers PT1, PT2. Thereafter, the SIMD computing unit 16 adds both of the data items rearranged by the rearranging circuits 20a, 20b and stores the result in the destination register $0.

With the third embodiment, the rearranging circuits 20a, 20b are provided in the stage before the SIMD computing unit 16. The rearranging circuits 20a, 20b rearrange the data read from the two source registers according to the pattern data stored in the pattern register 22 and then perform SIMD computing. Consequently, like the second embodiment, the third embodiment makes it possible to perform a required rearrangement, while reducing the number of instructions needed to rearrange data.

Furthermore, since data rearrangement and SIMD computing are performed with a single instruction, the computing speed can be improved.

Fourth Embodiment

Figure 12:
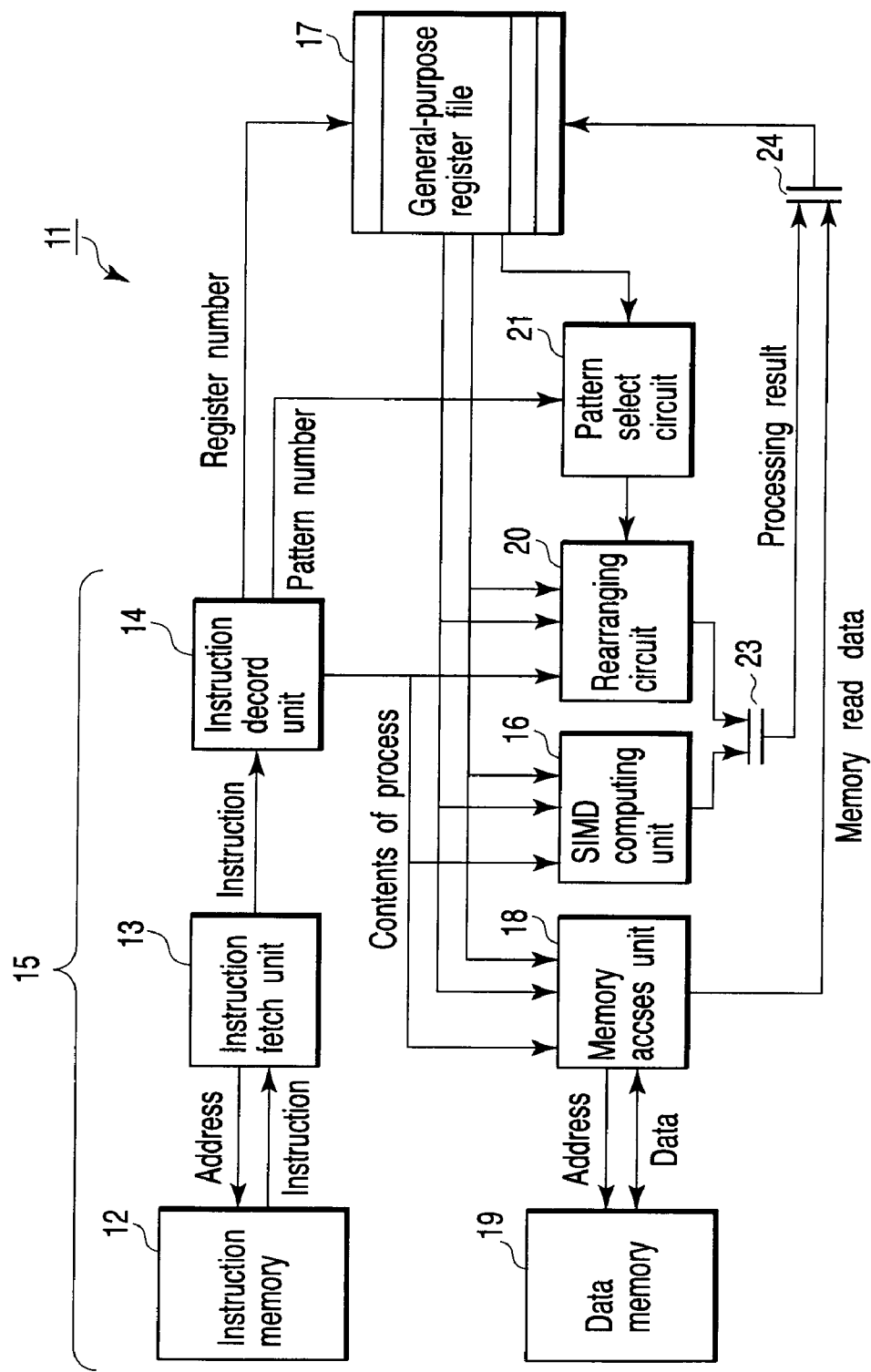
FIG. 12 shows the configuration of a processor according to a fourth embodiment of the invention.

FIG. 12 shows a processor according to a fourth embodiment of the invention. The fourth embodiment is a modification of the first embodiment. In the first embodiment, the special pattern registers 22 have been provided. In contrast, the fourth embodiment is such that rearrangement patterns are registered in the general-purpose register file 17 as shown in FIG. 12 and pattern data is read from the register file 17 and used as from the source register. That is, the general-purpose register file 17 also functions as a pattern register. Therefore, the pattern select circuit 21 is connected to the general-purpose register file 17.

FIGS. 13A to 13C each show an example of an instruction format executed by the processor with this configuration. Each of the instructions is composed of six bit fields: an operation code (OPCODE), two source registers (SRC1, SRC2), a destination register number (DEST), a pattern register number (PT), and a bit field (PL) indicating which part of the pattern register is used.

In the fourth embodiment, the number of bits needed to select a pattern is larger and the instruction length is longer than in the first embodiment. However, since a pattern register is not needed, the circuit configuration can be simplified.

Furthermore, use of the general-purpose register file 17 enables more pattern data to be stored than use of a pattern register composed of four registers, which enables more pattern data to be used.

Moreover, the fourth embodiment may be combined with the second or third embodiment.

Fifth Embodiment

FIG. 14 shows a processor according to a fifth embodiment of the invention. Unlike in the first to fourth embodiments, in the fifth embodiment, the rearranging circuits have the function of inverting bits in addition to the function of rearranging data.

Figure 15A:
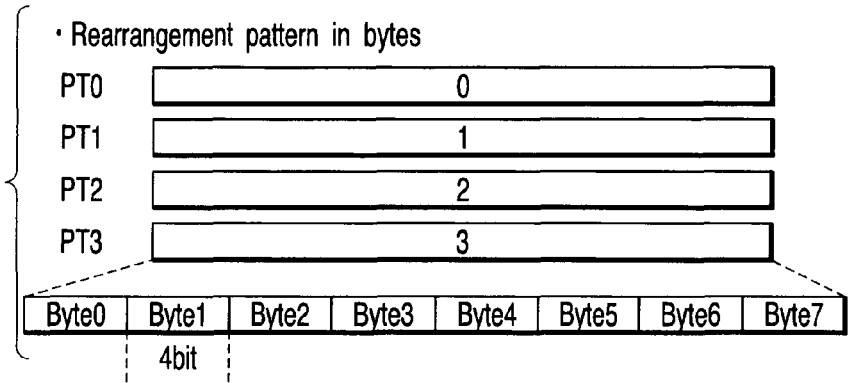
FIGS. 15A to 15D show the configurations of the pattern registers and the registration forms of pattern data.
Figure 15B:
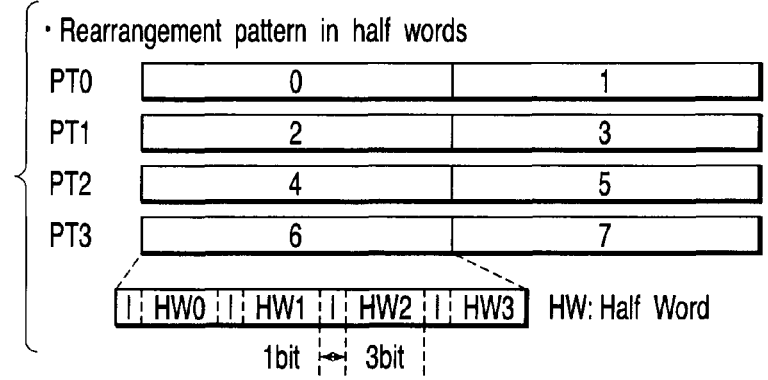
Figure 15C:
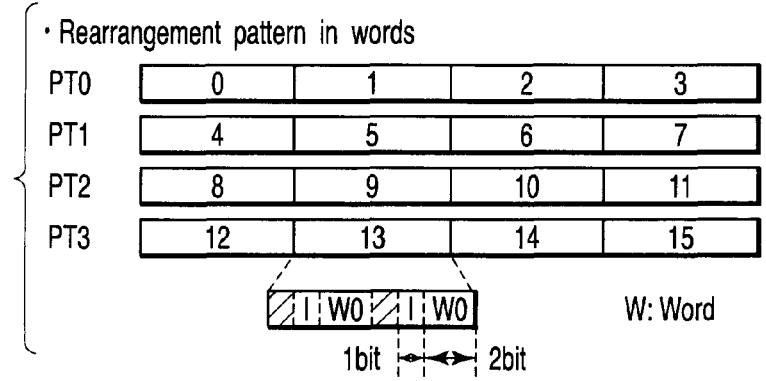

Specifically, in FIG. 14, for example, a rearranging and inverting circuit 30 is provided in parallel with the SIMD computing unit 16. When making a rearrangement in, for example, half words and words, the rearranging and inverting circuit 30 performs bit inverting on the basis of an inversion instruction specified using bits other than the pattern data in the pattern register. That is, for example, in the case of a half-word unit shown in FIG. 15B explained later, an unused one bit is used as an inversion specifying bit.

FIGS. 15A to 15D show the configurations of the pattern registers and the registration forms of pattern data.

Figure 15D:
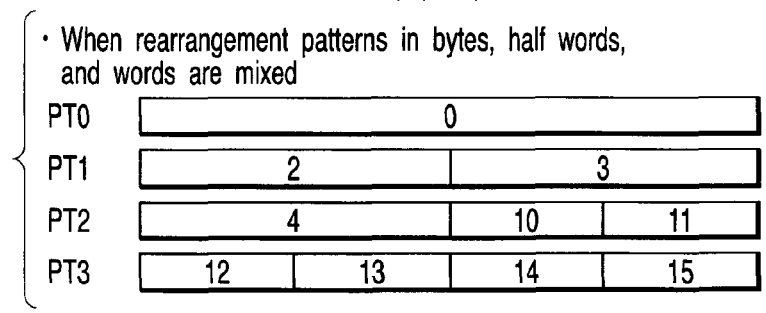

MAS. B in FIG. 15A and an example of registering pattern data items in a mixed manner shown in FIG. 15D are the same as in the first embodiment.

In the case of MAS. H shown in FIG. 15B, an unused bit exists for each half word. For this reason, this one bit is used as an inversion specifying bit. When the inversion specifying bit has been set to, for example, "1", a bit inverting operation is carried out.

In the case of MAS. W shown in FIG. 15C, the same form as in the first embodiment may be used. However, in FIG. 15C, the types of registrable pattern data are reduced to 16 types and the leftover bit is used as an inversion specifying bit. When the inversion specifying bit has been set to, for example, "1", a bit inverting operation is carried out.

FIGS. 16A to 16C each show an example of an instruction format according to the fifth embodiment. Each of the instructions shown in FIGS. 16A to 16C is composed of five bit fields: an operation code (OPCODE), a pattern register number (PT), source registers (SRC1, SRC2), and a destination register number DEST.

Operation code MASI. x (x=B, H, or W) means performing rearrangement and bit inversion. The 2-, 3-, or 4-bit pattern register number PT specifies pattern registers. It specifies pattern registers corresponding to the source registers SRC1, SRC2. The SRC1 and SRC2 indicate two source register numbers needed for processing, that is, general-purpose register numbers. DEST indicates the number of a destination register in which the result of computing is stored, that is, a general-purpose register number.

With the above configuration, when an MAS. x (H or W) instruction is issued, the rearranging and inverting circuit 30 reads not only the data in two source registers from the general-purpose register file but also the pattern data from the pattern register specified by the pattern register number PT in the instruction and rearranges the data. At that time, when the inversion specifying bit in the pattern data has been set to "1", only the data in which the inversion specifying bit has been set has its bits inverted at the same time of rearrangement. The data after the rearrangement and bit inversion is stored in the specified destination register.

According to the fifth embodiment, the rearranging and inverting circuit 30 has the function of rearranging data and inverting bits and inverts the bits in the rearranged data according to the inversion specifying data included in the pattern data. This makes it possible to perform data rearrangement and bit inversion with a single instruction, which enables the number of instructions to be reduced. Consequently, the computing speed can be increased.

While in the fifth embodiment, rearrangement and inversion have been carried out, the invention is not limited to this. For instance, in addition to rearrangement, an optional process other than the inverting operation may be set.

Furthermore, the rearranging and inverting circuit 30 (not limited to inversion) in the fifth embodiment may be applied to a configuration as shown in the second, third, and fourth embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An arithmetic device comprising:
a plurality of general-purpose registers which store parallel arithmetic data;
a plurality of pattern registers which store a plurality of items of pattern data indicating the rearrangement of the data, wherein the pattern registers store a plurality of items of pattern data using at least one of a smallest bit width, a bit width twice the smallest bit width, and a bit width n times the smallest unit (where n is a power-of-two number) as a unit;
a select circuit which selects one of said plurality of items of pattern data stored in said plurality of pattern registers according to specifying data included in an instruction, wherein the select circuit selects an overall pattern register when the parallel arithmetic data is rearranged using the smallest bit width as a unit, selects one of the areas obtained by dividing the pattern register in two when the parallel arithmetic data is rearranged using a rearrangement bit width twice the smallest unit as a unit, and selects any one of the areas obtained by dividing the pattern register into n parts or more than n parts when the parallel arithmetic data is rearranged using a bit width n times the smallest unit (where n is a power-of-two number) as a unit; and
a rearranging circuit which rearranges the parallel arithmetic data according to the item of the pattern data selected by the select circuit.

2. The arithmetic device according to claim 1, wherein said plurality of general-purpose registers are used as the pattern registers.

3. The arithmetic device according to claim 1, wherein the rearranging circuit includes an inverting circuit which inverts bits of rearranged data according to inversion specifying data.

4. The arithmetic device according to claim 1, further comprising:

a parallel computing unit which performs an arithmetical operation on rearranged parallel arithmetic data supplied from said plurality of general-purpose registers; and a selector which selects one of the output data from the parallel computing unit and the output data from the rearranging circuit and which supplies one of the data output from the rearranging circuit and the output data from the parallel computing unit to the general-purpose register.

5. An arithmetic device comprising:

a plurality of general-purpose registers which store parallel arithmetic data;

a parallel computing unit which performs an arithmetical operation on parallel arithmetic data supplied from said plurality of general-purpose registers;

a plurality of pattern registers which store a plurality of items of pattern data indicating the rearrangement of the data, wherein the pattern registers store a plurality of items of pattern data using at least one of a smallest bit width, a bit width twice the smallest bit width, and a bit width n times the smallest unit (where n is a power-of-two number) as a unit;

a select circuit which selects one of said plurality of items of pattern data stored in said plurality of pattern registers according to specifying data included in an instruction, wherein the select circuit selects an overall pattern register when the parallel arithmetic data is rearranged using the smallest bit width as a unit, selects one of the areas obtained by dividing the pattern register in two when the parallel arithmetic data is rearranged using a bit width twice the smallest unit as a unit, and selects any one of the areas obtained by dividing the pattern register into n parts or more than n parts when the parallel arithmetic data is rearranged using a bit width n times the smallest unit (where n is a power-of-two number) as a unit; and a rearranging circuit which rearranges the data output from the parallel computing unit according to the item of the pattern data selected by the select circuit.

6. The arithmetic device according to claim 5, wherein said plurality of general-purpose registers are used as the pattern registers.

7. The arithmetic device according to claim 5, wherein the rearranging circuit includes an inverting circuit which inverts bits of rearranged data according to inversion specifying data.

8. An arithmetic device comprising:

a plurality of general-purpose registers which store parallel arithmetic data;

a plurality of pattern registers which store a plurality of items of pattern data indicating the rearrangement of the data, wherein the pattern registers store a plurality of items of pattern data using at least one of a smallest bit width, a bit width twice the smallest bit width, and a bit width n times the smallest unit (where n is a power-of-two number) as a unit;

a select circuit which selects one of said plurality of items of pattern data stored in said plurality of pattern registers according to specifying data included in an instruction, wherein the select circuit selects an overall pattern register when the parallel arithmetic data is rearranged using the smallest bit width as a unit, selects one of the areas obtained by dividing the pattern register in two when the parallel arithmetic data is rearranged using a bit width twice the smallest unit as a unit, and selects any one of the areas obtained by dividing the pattern register into n parts or more than n parts when the parallel arithmetic data is rearranged using a bit width n times the smallest unit (where n is a power-of-two number) as a unit;

a plurality of rearranging circuits which rearrange data supplied from said plurality of general-purpose registers according to the item of the pattern data selected by the select circuit; and a parallel computing unit which performs an arithmetical operation on the data supplied from said plurality of rearranging circuits.

9. The arithmetic device according to claim 8, wherein said plurality of general-purpose registers are used as the pattern registers.

10. The arithmetic device according to claim 8, wherein said plurality of rearranging circuits each include an inverting circuit which inverts bits of rearranged data according to an inversion specifying data.

* * * * *